United States Patent [19]
Rabl et al.

[11] Patent Number: 5,369,528
[45] Date of Patent: Nov. 29, 1994

[54] PLANE OR CYLINDRICAL REFLECTOR FOR SOURCE OF RADIATION

[75] Inventors: Ari Rabl, Bures-sur-Yvette, France; Jeff M. Gordon, Sede Boker, Israel

[73] Assignee: Association pour la Recherche et le Developpement des Methodes et Processus Industriels - A.R.M.I.N.E.S., Paris, France

[21] Appl. No.: 964,829

[22] Filed: Oct. 22, 1992

[30] Foreign Application Priority Data

Oct. 25, 1991 [FR] France ................ 91 13226

[51] Int. Cl.$^5$ .................... G02B 5/10; F21V 7/00
[52] U.S. Cl. .................... 359/855; 359/867; 359/869; 362/346; 362/347
[58] Field of Search ............ 359/855, 867, 869; 362/297, 346, 347

[56] References Cited

U.S. PATENT DOCUMENTS

| | | |
|---|---|---|
| 4,095,113 | 6/1978 | Wolff . |
| 4,106,083 | 8/1978 | Wolff . |
| 4,114,592 | 9/1978 | Winston ................ 359/867 |
| 4,130,107 | 12/1978 | Rabl et al. ............. 359/867 |
| 4,196,354 | 4/1980 | Wolff . |
| 4,309,616 | 1/1982 | Wolff . |
| 4,425,604 | 1/1984 | Imai et al. ............ 362/346 |
| 4,922,107 | 5/1990 | Rabl et al. ............ 359/869 |
| 4,947,305 | 8/1990 | Gunter, Jr. ........... 362/297 |
| 4,964,713 | 10/1990 | Goetzberger . |
| 4,990,788 | 2/1991 | Rabl et al. ............ 359/867 |
| 5,253,151 | 10/1993 | Mepham et al. ....... 362/297 |

FOREIGN PATENT DOCUMENTS

| | | |
|---|---|---|
| 0504407 | 2/1978 | Australia . |
| 2648543 | 12/1990 | France . |
| 0912321 | 5/1954 | Germany ............. 362/347 |
| 8714134 | 1/1988 | Germany . |
| 8905463 | 6/1989 | WIPO . |

*Primary Examiner*—Edward K. Look
*Assistant Examiner*—Christopher Verdier
*Attorney, Agent, or Firm*—Sandler, Greenblum & Bernstein

[57] ABSTRACT

Reflector for source of radiation, of the plane or cylindrical type, constituted by two reflector elements disposed symmetrically with respect to a plane containing the longitudinal axis of the reflector, each reflector element is constituted by at least one cylindrical part of which the generatrices are parallel to the longitudinal axis of the reflector, the cross-section of this cylindrical part being constituted by a curve such that the rays reflected by the respective ends of this curve constitute two end rays forming respective angles with the plane of symmetry, all the rays reflected on the reflector element being included between the respective angles.

20 Claims, 7 Drawing Sheets

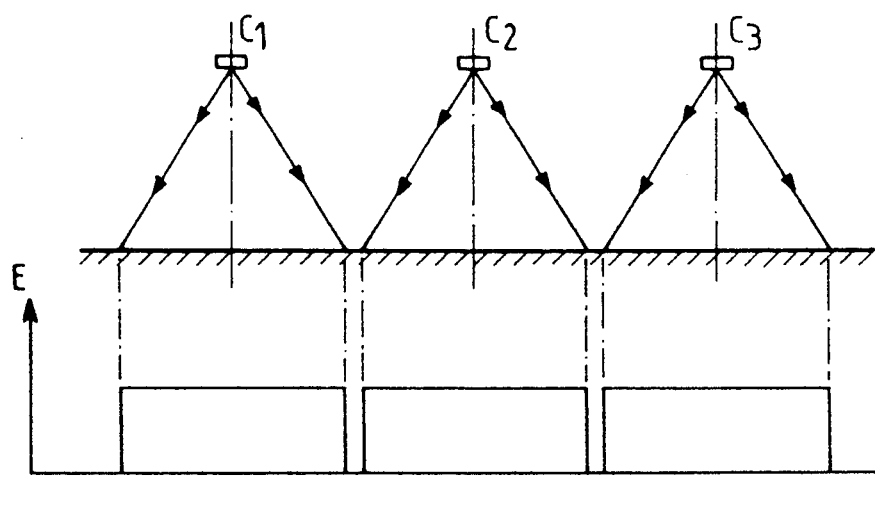
FIG. 1a PRIOR ART
FIG. 1b PRIOR ART
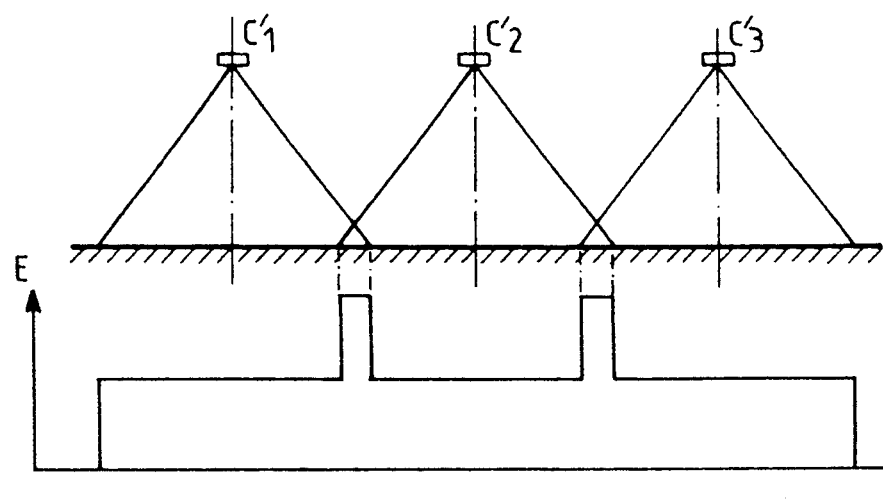
FIG. 2a PRIOR ART
FIG. 2b PRIOR ART
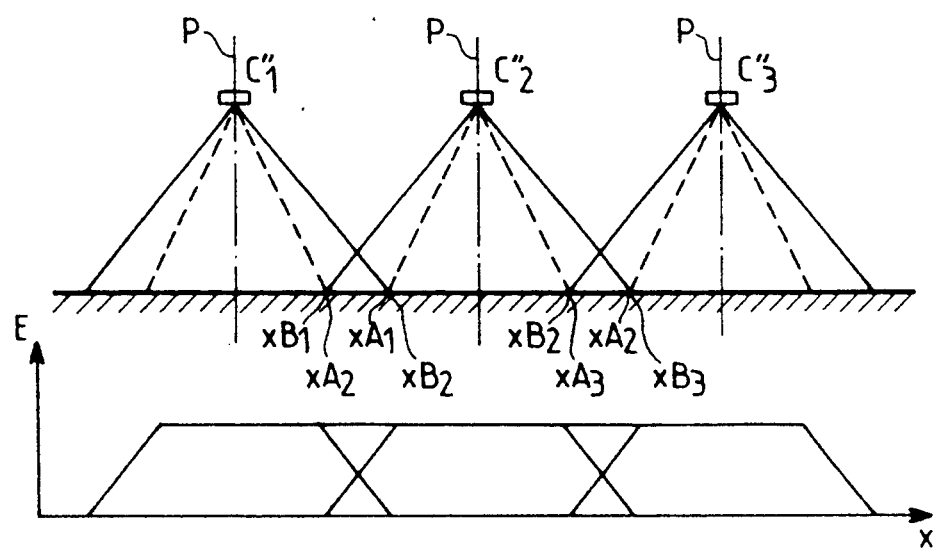
FIG. 3a
FIG. 3b

PLANE OR CYLINDRICAL REFLECTOR FOR SOURCE OF RADIATION

FIELD OF THE INVENTION

The present invention relates to a reflector for source of radiation intended, in combination with other reflectors of the same type, to ensure a substantially uniform distribution of the radiation over a considerable "target surface".

BACKGROUND OF THE INVENTION

So-called "CPC" type reflectors are known, particularly by Patent FR-A-2 648 543, which, from a source of radiation which is either plane or cylindrical, make it possible to distribute, uniformly, over a target surface, a radiation presenting a maximum energetic yield, and which, moreover, make it possible to limit to a given value, in the transverse direction, i.e. in the direction perpendicular to the longitudinal axis of the light source, the angle formed by the rays on leaving the reflector and the vertical, so as to reduce the phenomena of dazzling.

In this type of reflector, transverse limitation of the radiation is effected suddenly without any progressiveness. This is why it is particularly difficult to associate reflectors of this type together for the purpose of obtaining a uniform light distribution since, (FIG. 1a), a too spaced apart arrangement of two adjacent reflectors leads to creating a defective illumination between these reflectors, whilst too close an arrangement of two adjacent reflectors (FIG. 2a) leads to creating a zone of overlapping of radiations presenting an intensity of radiation substantially equal to double that of the adjacent zone. This is why, unless each of the reflectors is disposed transversely with respect to one another, in a particularly precise manner, it is extremely difficult to obtain a uniform transverse distribution of the radiation.

It is an object of the present invention to propose a CPC type reflector mentioned above which at the same time presents an optimum energetic yield, makes it possible to control the transverse angular distribution of the radiation in order to minimize the risks of dazzling, and which provides, in association with other reflectors of the same type, a transverse distribution of the radiation of which the uniformity over a target surface is improved, without necessitating a particularly precise positioning of the reflectors.

SUMMARY OF THE INVENTION

The present invention thus relates to a reflector for source of radiation, of the plane or cylindrical type, constituted by two reflector elements disposed symmetrically with respect to a plane containing the longitudinal axis of the reflector, characterized in that each reflector element is constituted by at least one cylindrical part of which the generatrices are parallel to the longitudinal axis of the reflector, the cross-section of this cylindrical part being constituted by a "curve constructed by end rays", namely, a curve such that the rays reflected by the respective ends of this curve constitute two end rays forming respective angles with the plane of symmetry, all the rays reflected on the reflector element being included between the respective angles.

The present invention is particularly applicable both to plane sources of radiation and to cylindrical sources of radiation.

Moreover, applicants have ascertained that, by creating a separation between the transverse edges of the source of radiation and the rear edges of the reflector (in the case of a plane source of radiation) and between the rear generatrix of the source of radiation and the bottom of the reflector (in the case of a cylindrical source of radiation), the uniformity of the distribution of the radiation produced by a plurality of adjacent, reflectors was considerably improved.

BRIEF DESCRIPTION OF THE DRAWINGS

The invention will be more readily understood on reading the following description with reference to the accompanying drawings, in which:

FIG. 1a is a schematic view of three reflectors of the prior art which are associated transversely and of which the radiations, issuing from two adjacent reflectors, are not contiguous on a target surface.

FIG. 1b is a diagram showing the distribution of the intensity of the radiations furnished by the three reflectors of FIG. 1a on the target surface.

FIG. 2a is a schematic view of three reflectors of the prior art associated transversely and of which the radiations issuing from two adjacent reflectors, overlap on a target surface.

FIG. 2b is a diagram showing the distribution of the intensity of the radiations furnished by the three reflectors of FIG. 2a on the target surface.

FIG. 3a is a schematic view of three reflectors according to the invention which are associated transversely and of which the radiations of two adjacent reflectors overlap on a target surface.

FIG. 3b is a diagram showing the distribution of the intensity of the radiations furnished by the three reflectors of FIG. 3a on the target surface.

DETAILED DESCRIPTION OF THE PREFERRED EMBODIMENTS

Figure 4:
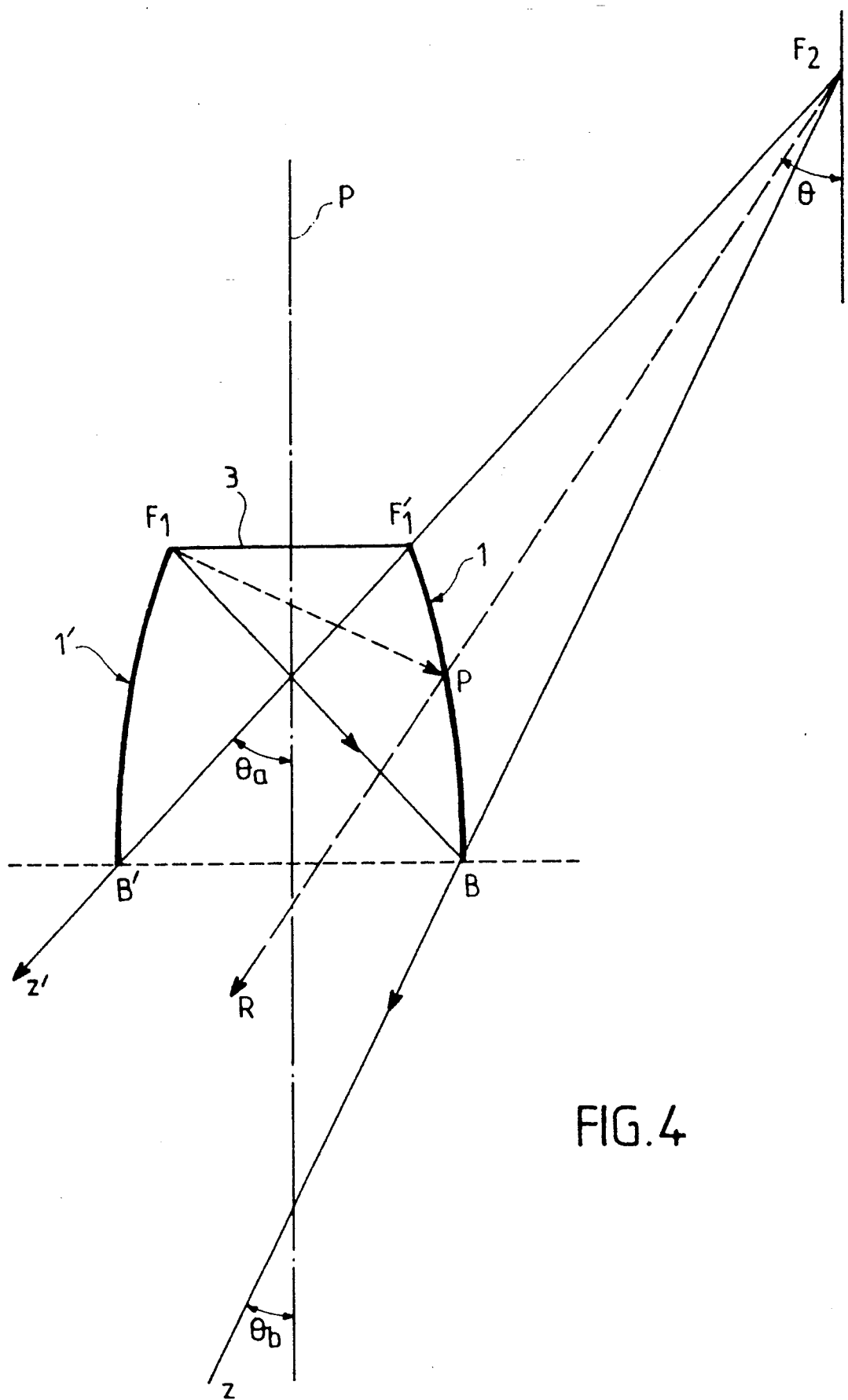
FIG. 4 is a schematic view in transverse section of a reflector according to the invention, equipped with a plane source of radiation.

Referring again to the drawings and as shown in FIG. 4, the reflector according to the invention is composed of two reflector elements, symmetrical with respect to a vertical plane P, perpendicular to the plane of FIG. 4, namely a right-hand reflector element 1 and a left-hand reflector element 1' in the Figure. The cross-section of each of these reflector elements 1 and 1', through a vertical plane perpendicular to plane P, is constituted by an arc of hyperbola $F'_1B$ and $F_1B'$ respectively. A plane source of radiation 3, of substantially rectangular shape, is located between the rear ends $F_1$ and $F'_1$ of the reflector elements 1 and 1'. Points $F_1$ and $F'_1$ constitute, moreover, the first respective foci of the arcs of hyperbola $F'_1B$ and $F_1B'$. The second respective foci $F_2$ and $F'_2$ (to render the Figure clearer, only focus $F_2$ is shown in the drawing) of these arcs of hyperbola are located to the rear of the reflector and are offset laterally on either side of plane P.

Under these conditions, any incident ray coming from the source of radiation 3 and issuing from the first focus $F_1$, is reflected on the right-hand reflector element 1, along a ray passing through the second focus $F_2$ of this reflector element 1.

Figure 5:
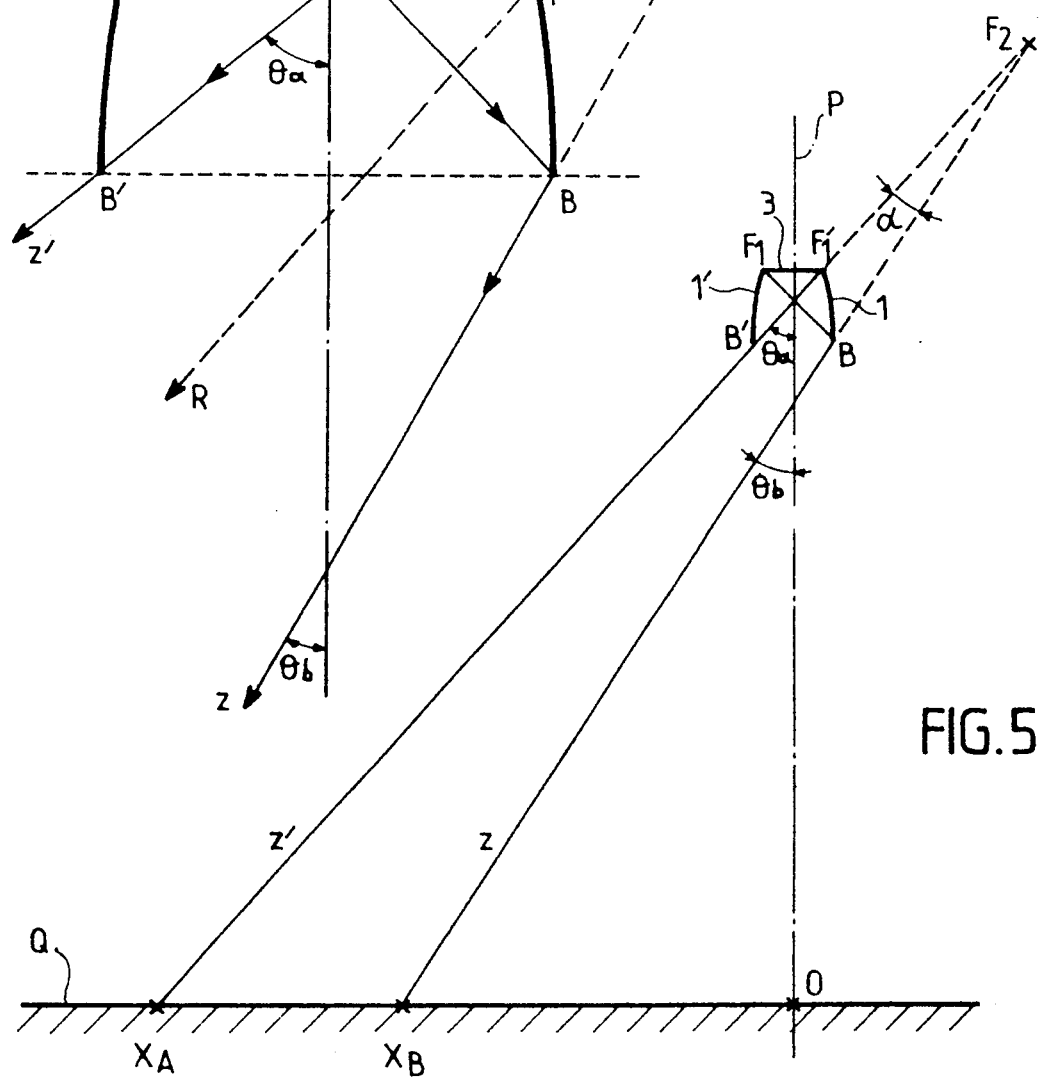
FIG. 5 is a partial schematic view, on a smaller scale, of the reflector shown in FIG. 4 and of its radiation on a target surface.

In particular, a first end ray, issuing from focus $F_1$, is reflected on the anterior end B of the reflector element 1, along a ray Bz forming an angle $\theta_b$ with plane P, whose virtual extension passes through focus $F_2$ of the reflector element 1. Similarly, a second end ray issuing from focus $F_1$ is reflected on the posterior end $F'_1$ of the reflector element 1, along a ray $F'_1z'$, forming an angle $\theta_a$ with plane P, whose virtual extension passes through focus $F_2$ of the reflector element 1. As shown in FIG. 5, the two end rays Bz and B'z' respectively encounter a horizontal target surface Q at points $x_B$ and $x_A$.

In FIG. 5, the plane of symmetry P of the reflector encounters the target surface Q at point O, and the segment $0x_A$ (as well, of course, as the segment which is symmetrical thereto with respect to plane P) represents the maximum transverse distance of the target surface Q capable of receiving a radiation.

Figure 6:
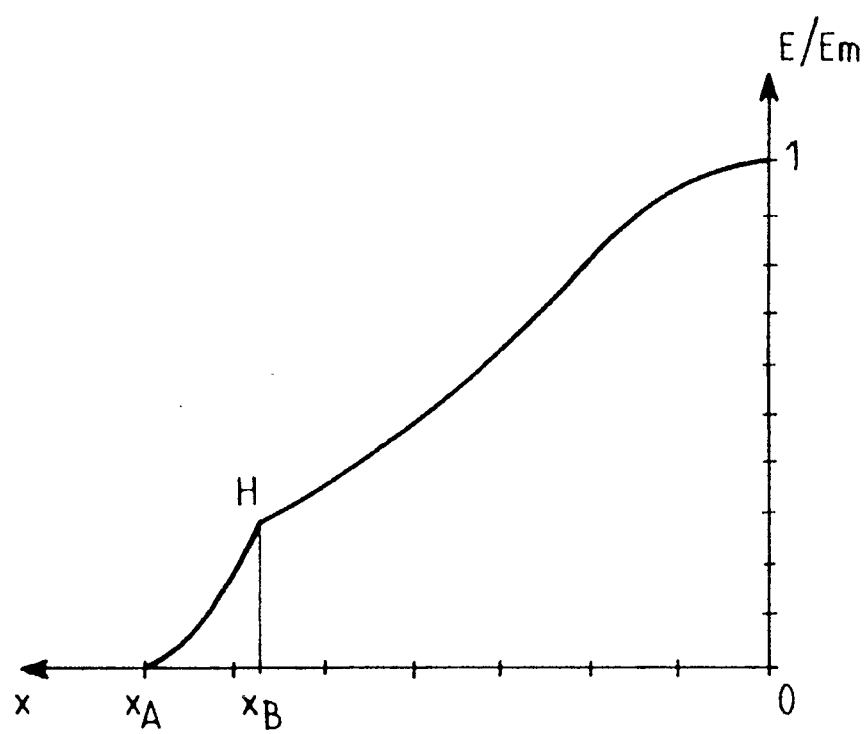
FIG. 6 is a diagram representing the distribution of the ratio of the radiation E, received by the target surface, on the maximum $E_m$ received thereby, in the transverse direction of the target surface, for a reflector of the type shown in FIGS. 4 and 5.

Between point O and point $x_A'$ the distribution of the radiation is as represented by the curve of FIG. 6. This curve shows that the radiation E is maximum at point O, which corresponds to the center of the reflector (in other words, the ration $E/E_m$ is equal to 1) and that it then gradually decreases up to point $x_B$ where there is a point of retrogression H, thereafter decreasing more rapidly up to point $x_A$ where the radiation is zero. Of course, the course of this curve varies with the angles $\theta_a$ and $\theta_b$ which constitute characteristic parameters which it is desired to give the reflector, the diagram of FIG. 6 being obtained for angles $\theta_a = \theta_b = 50°$.

Figure 7:
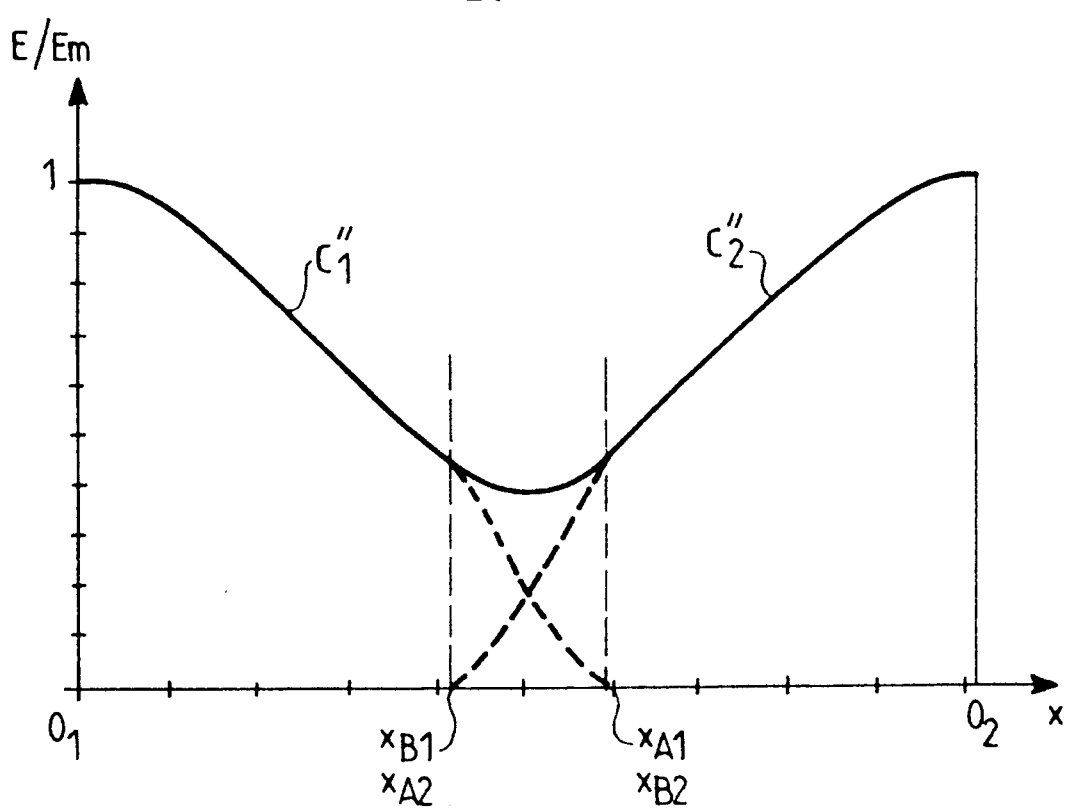
FIG. 7 is a diagram representing the distribution of the ratio of the radiation E, received by the target surface, on the maximum radiation $E_m$ received thereby, in the transverse direction of the target surface, for two reflectors of the type shown in FIGS. 4 and 5.

When two reflectors of this type, such as reflectors $C''_1$ and $C''_2$ in FIG. 3a, are disposed side by side so that their planes of symmetry P are parallel and the end points $x_{A1}$ and $x_{B1}$ of the reflector $C''_1$ merge respectively with the end points $x_{B2}$ and $x_{A2}$ of the other reflector $C''_2$, there is obtained between the centers of radiation $0_1$ and $0_2$ of the two reflectors, as shown in FIG. 7, a distribution of the radiation of which the ratio $E/E_m$ passes through a minimum at the center of the zone included between points $x_{A2}$, $x_{B1}$ on the one hand and points $x_{A1}$, $x_{B2}$ on the other hand. According to the invention, it is ascertained that, by moving the reflectors slightly towards or away from one another from the ideal position shown in FIG. 7, a lowering and a rise of the minimum of the radiation distribution curve is respectively provoked, without this variation going as far as producing, respectively, a zone without radiation or, on the contrary, a zone whose radiation is greater than the maximum level of radiation desired for the reflector.

The present invention therefore contributes a tolerance in the lateral positioning of associated reflectors to produce a virtually uniform radiation on a target surface.

Figure 8:
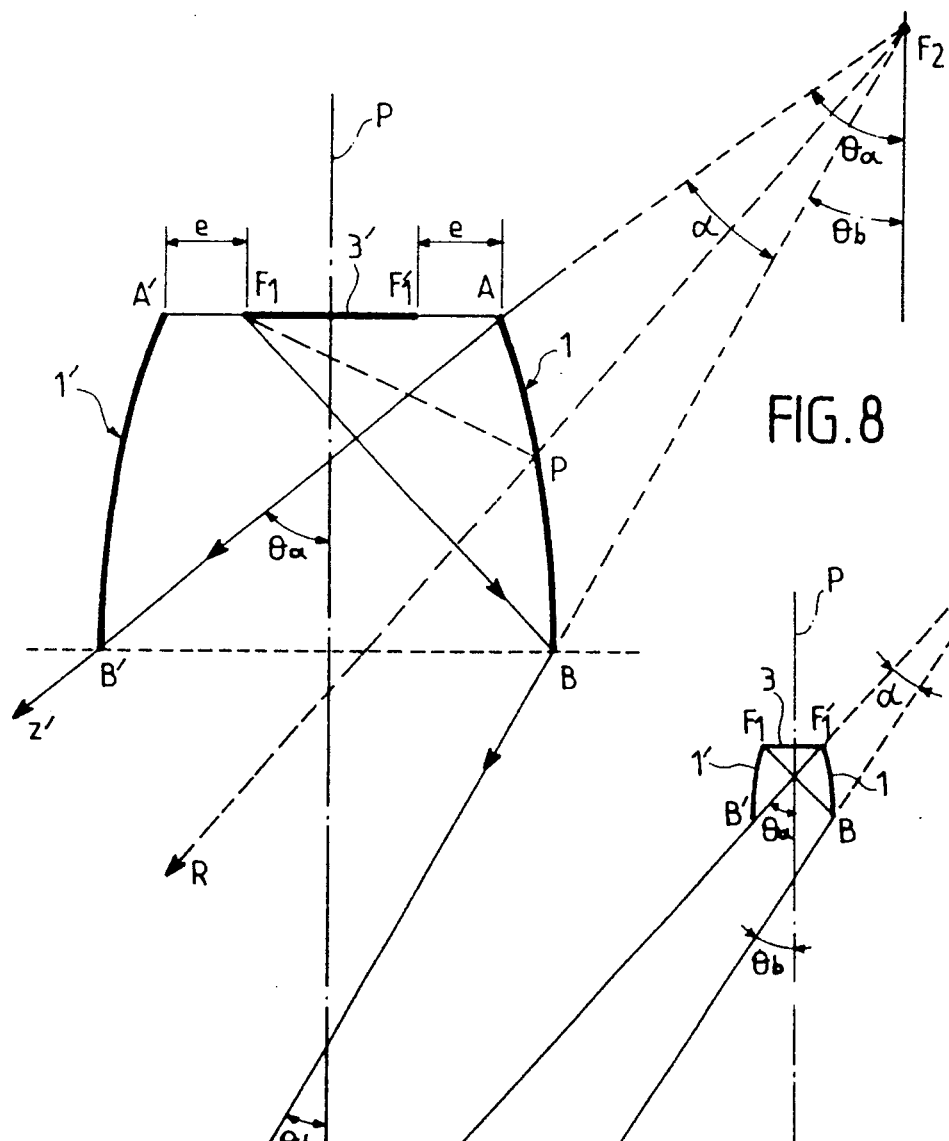
FIG. 8 is a schematic view in transverse section of a variant embodiment of the reflector shown in FIG. 4.
Figure 9:
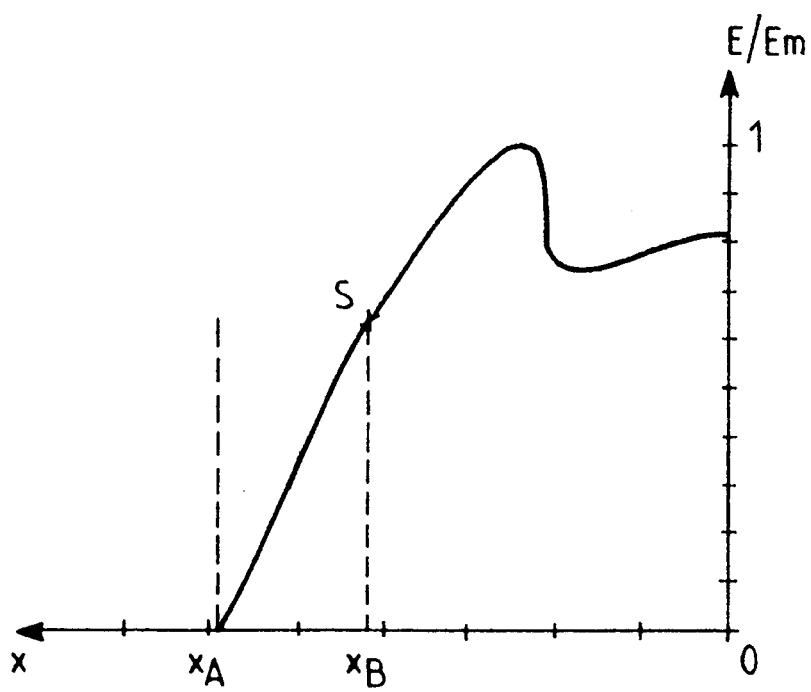
FIG. 9 is a diagram representing the distribution of the ratio of the radiation E received by the target surface, on the maximum radiation $E_m$ received thereby, in the transverse direction of the target surface, for the reflector shown in FIG. 8.
Figure 10:
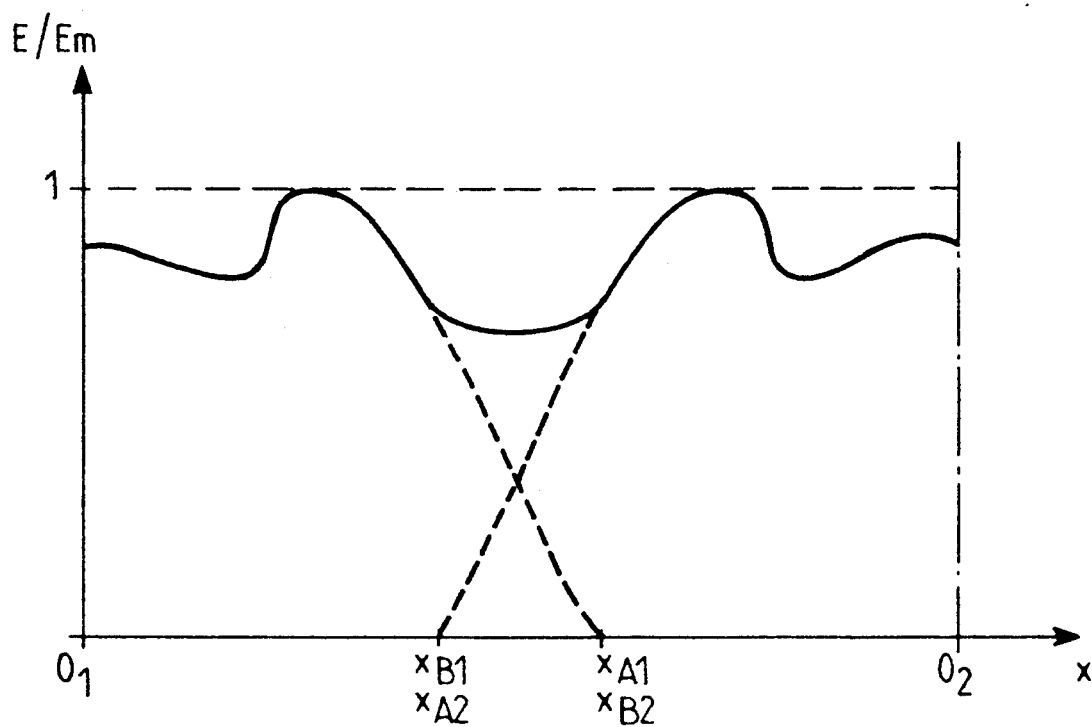
FIG. 10 is a diagram showing the distribution of the ratio of the radiation E, received by the target surface, on the maximum radiation $E_m$ received thereby, in the transverse direction of the target surface, for two reflectors of the type shown in FIG. 8.

In order to improve the uniformity of the radiation furnished by the reflector, a plane source of radiation 3' may be used, as shown in FIG. 8, and reflector elements 1 and 1' whose respective posterior ends A and A' do not merge with the ends $F'_1$ and $F_1$ of the plane source of radiation 3', so that there is a space e between the transverse ends of the source of radiation 3' and the posterior edge of the reflector. The rays are constructed in the same manner as before, and a distribution of the radiation on the target surface Q is in that case obtained, which is different and which is as shown in FIG. 9. This distribution of the radiation is closer to a uniform distribution than that procured by the embodiment in which no space is provided between the source of radiation 3 and the reflector elements 1 and 1', at least between points 0 and $x_B$. Then, in the zone of the target surface Q included between points $x_B$ and $x_A$, the radiation decreases in virtually linear manner and becomes zero at point $x_A$. Thus, if two adjacent reflectors of this type are associated so that their respective zones included between points $x_A$ and $x_B$ overlap, there is obtained, between their respective centers of radiation $0_1$ and $0_2$, a distribution of the radiation whose ratio $E/E_m$ is represented by the curve of FIG. 10. This latter demonstrates an improvement in the uniformity of distribution of the radiation furnished by the reflectors.

Figure 11:
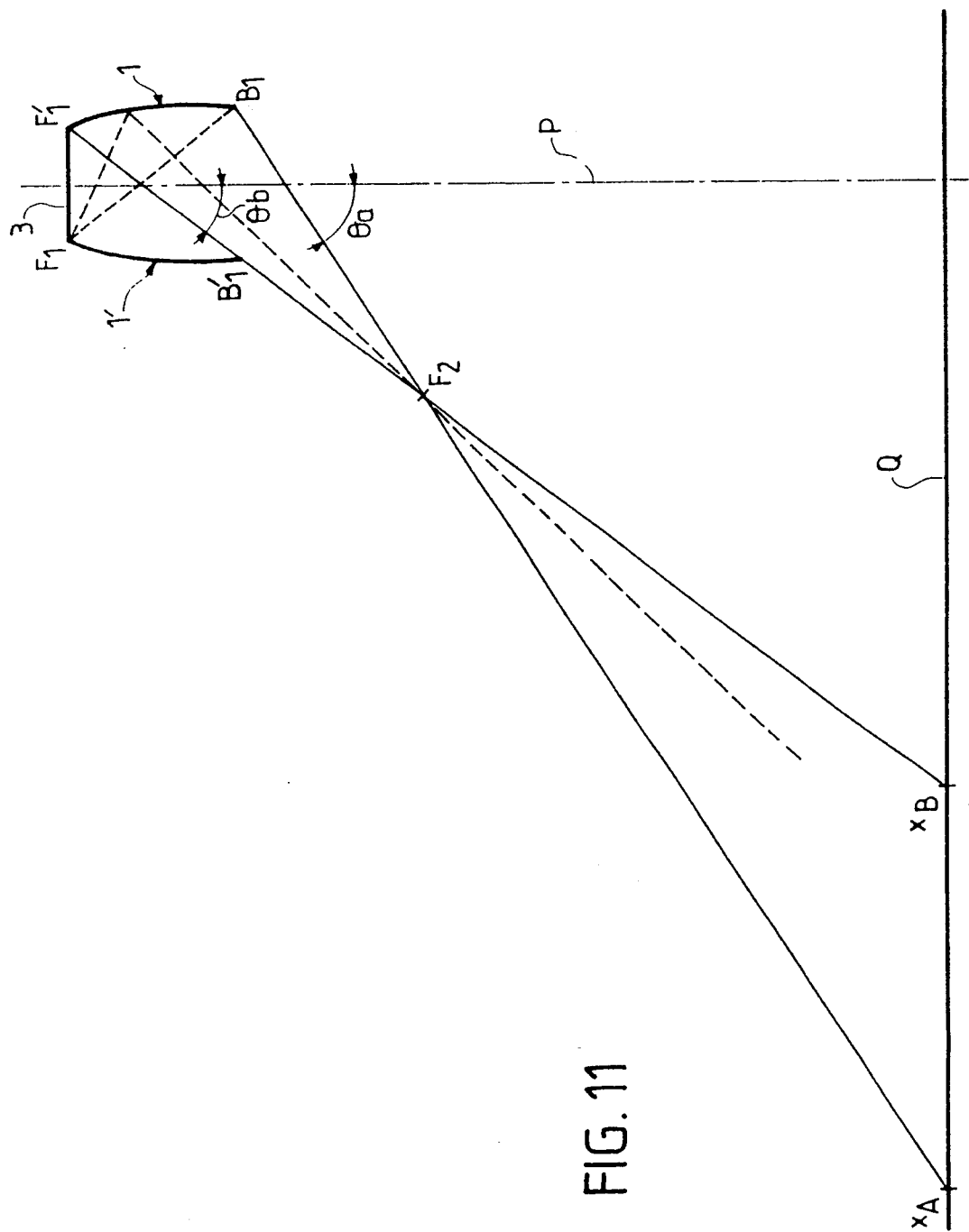
FIG. 11 is a schematic view in partial transverse section of a variant embodiment of the reflector according to the invention.

According to the invention, the curve so-called "constructed by end rays" may also be constituted by an ellipse. In such an embodiment and as shown in FIG. 11, the reflector elements 1 and 1' have respective cross-sections in the form of arcs of ellipse $F'_1B_1$ and $F_1B'_1$, which have respective foci $F_1$, $F_2$. For reasons of symmetry, the focus $F'_2$ of the arc of ellipse $F_1B'_1$ is not shown in the drawing. Thus, the end ray $F_1B_1$ issuing from focus $F_1$ is reflected at the anterior end $B_1$ of the reflector element 1 along ray $B_1F_2$ and encounters the target surface Q at a point $x_A$. Similarly, the end ray $F_1F'_1$ issuing from focus $F_1$ is reflected on the posterior end $F'_1$ of the reflector element along a ray $F'_1F_2$, and encounters the target surface Q at a point $x_B$.

Under these conditions, distribution of the radiation is qualitatively identical to that of FIG. 6.

Figure 12:
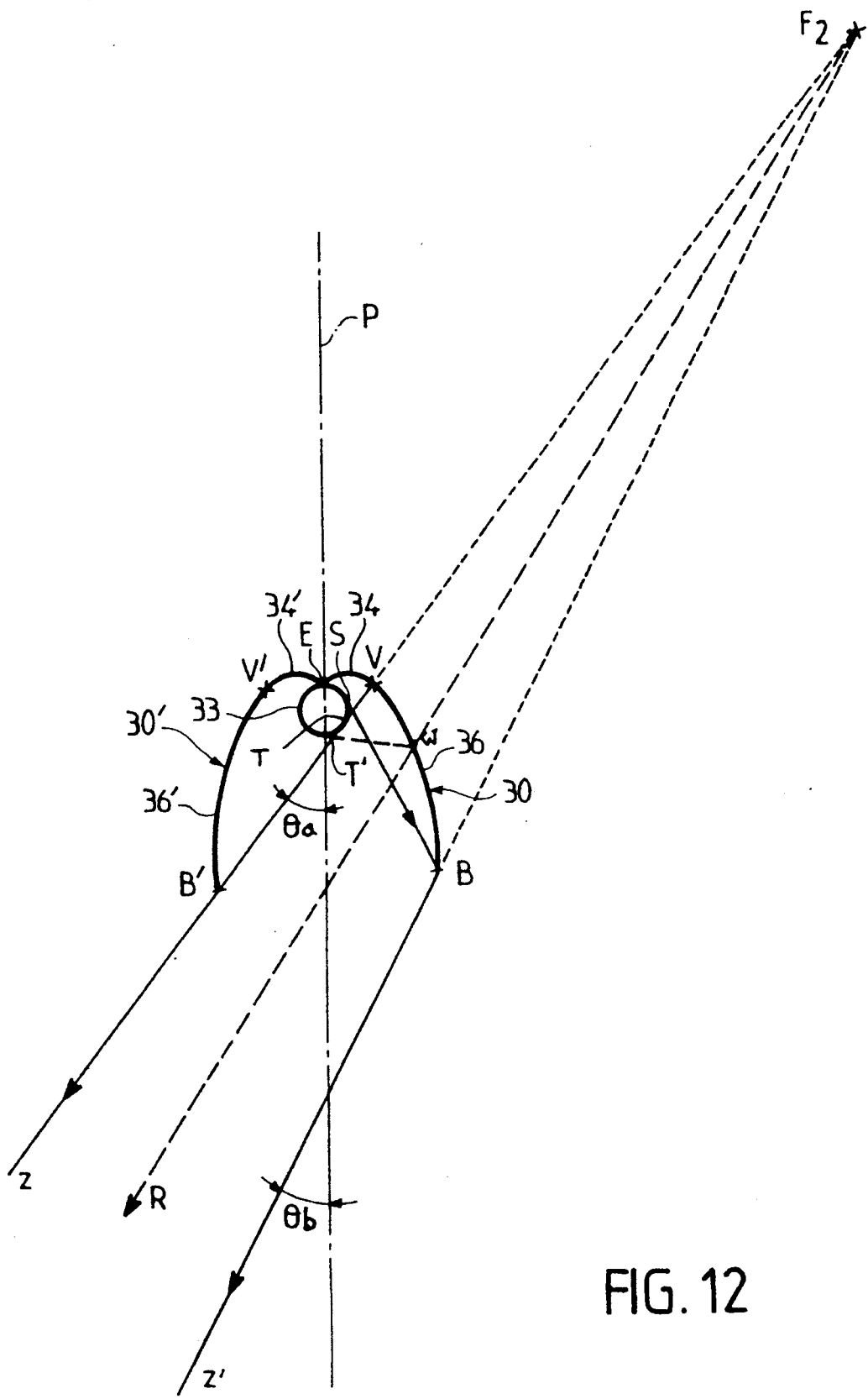
FIG. 12 is a schematic view in partial transverse section of another variant embodiment of the reflector according to the invention.

The present invention may also be used when the source of radiation is cylindrical in shape. For example, FIG. 12 shows a reflector composed of two reflector elements, symmetrical with respect to a vertical plane P, namely a right-hand reflector element 30 and a left-hand reflector element 30' in the Figure. The source of radiation used is cylindrical in shape and its directrix is constituted by a circle 33. The cylindrical source of radiation is in contact, at point E, with the bottom of the reflector and is disposed symmetrically with respect to plane P. Each of the reflector elements 30 and 30' is constituted by two parts, namely a posterior part 34, 34', in the form of a conventional involute to a circle, and a so-called generalized involute anterior part 36, 36', and which also constitutes a "curve constructed by end rays" and which is joined at a point V,V' tangentially to the first.

A first end ray is constituted by a ray TV tangential, at a point T, to the circle 33 and forming with the plane P an angle $\theta_a$ equal to the maximum transverse reflected ray desired. This ray striking the "curve constructed by end rays" is reflected on itself at point V along ray Vz, passing through focus F2 of the curve. The reflected ray Vz also defines the anterior point B' of the other reflector element 30' which lies at the intersection of the arc defining the reflector element 30' with the straight line Vz. Similarly, all the rays tangential at a point T' to the circle 33 and reflecting on VB reflect on the latter at a point W, in a direction $F_2W$.

Furthermore, according to the invention, by reason of the properties of the conventional involute to a circle, all the rays tangential to circle 33 reflect on themselves, with the result that all the rays included between points T and E emerge from the reflector and therefore constitute effective rays irradiating the target surface.

As set forth hereinbefore, the regularity of the illumination furnished by the reflector according to the invention may be further improved if the cylindrical light source is moved away from the bottom of the reflector.

What is claimed is:

1. A plurality of reflectors for providing substantially uniform radiation over a target surface, comprising:

said plurality of reflectors positioned adjacent each other, each of said plurality of reflectors comprising:

a source of radiation;

two reflector elements for reflecting rays of said source of radiation on said target surface symmetrically positioned with respect to a plane of symmetry passing through a longitudinal axis of said two reflector elements;

each reflector element being composed of at least one curved part comprising generatrices which are parallel to said longitudinal axis, said curved part comprising a cross-section of a curve having respective ends, so that rays reflected by said respective ends comprise two end rays forming respective angles with said plane of symmetry of said two reflector elements, and all rays reflected on said reflector elements are included between said respective angles; and any ray tangential to said source of radiation is reflected on passing through a focus of said curve, said focus being positioned upstream of the target surface.

2. The reflector according to claim 1, wherein said curved part comprises an arc of an hyperbola.

3. The reflector according to claim 1, wherein said curved part comprises an arc of an ellipse.

4. The reflector according to claim 1, wherein said source of radiation comprises a plane source, symmetrical with respect to said plane of symmetry, and arranged in a plane passing through rear edges of said two reflector elements.

5. The reflector according to claim 4, comprising a space between respective transverse ends of said source of radiation and said rear edges of said two reflector elements.

6. The reflector according to claim 1, wherein said source of radiation is cylindrical comprising a circular directrix whose generatrices are parallel to said longitudinal axis and symmetrical to the plane of symmetry.

7. The reflector according to claim 6, wherein each of said two reflector elements is composed of two curved portions, one of said two curved portions comprising a first posterior cylindrical part in the form of an involute to a circle, and the other of said two curved portions comprising a second anterior part comprising said at least one curved part, and said second anterior part is tangentially connected to said first posterior part.

8. The reflector according to claim 7, wherein said first posterior part and said second anterior part are tangentially connected at a point.

9. The reflector according to claim 6, comprising a separation between said cylindrical source of radiation and bottom portions of said two reflector elements.

10. Reflector comprising:

a source of radiation;

two reflector elements for reflecting rays of said source of radiation on a target surface symmetrically positioned with respect to a plane of symmetry passing through a longitudinal axis of said two reflector elements;

each reflector element being composed of at least one curved part comprising generatrices which are parallel to said longitudinal axis, said curved part comprising a cross-section of a curve having respective ends, so that rays reflected by said respective ends comprise two end rays forming respective angles with said plane of symmetry of said two reflector elements, and all rays reflected on said reflector elements are included between said respective angles; and any ray tangential to said source of radiation is reflected on passing through a focus of said curve, said focus being positioned upstream of the target surface.

11. The reflector according to claim 10, wherein said curved part comprises an arc of an hyperbola.

12. The reflector according to claim 10, wherein said curved part comprises an arc of an ellipse.

13. The reflector according to claim 10, wherein said source of radiation comprises a plane source, symmetrical with respect to said plane of symmetry, and arranged in a plane passing through rear edges of said two reflector elements.

14. The reflector according to claim 13, wherein a focus of said curved part comprises a transverse end of said plane source farthest from said curved part.

15. The reflector according to claim 14, comprising a space between respective transverse ends of said source of radiation and said rear edges of said two reflector elements.

16. The reflector according to claim 10, wherein said source of radiation is cylindrical comprising a circular directrix whose generatrices are parallel to said longitudinal axis and symmetrical to the plane of symmetry.

17. The reflector according to claim 16, wherein each of said two reflector elements is composed of two curved portions, one of said two curved portions comprising a first posterior cylindrical part in the form of an involute to a circle, and the other of said two curved portions comprising a second anterior part comprising said at least one curved part, and said second anterior part is tangentially connected to said first posterior part.

18. The reflector according to claim 17, wherein said first posterior part and said second anterior part are tangentially connected at a point.

19. The reflector according to claim 16, comprising a separation between said cylindrical source of radiation and bottom portions of said two reflector elements.

20. The reflector according to claim 11, wherein said source of radiation comprises a plane source, symmetrical with respect to said plane of symmetry, and arranged in a plane passing through rear edges of said two reflector elements.

* * * * *